US009216792B2

(12) United States Patent
Han et al.

(10) Patent No.: US 9,216,792 B2
(45) Date of Patent: Dec. 22, 2015

(54) CHAINLESS ELECTRIC BICYCLE

(71) Applicant: Sang Hoon Han, Seongnam-si (KR)

(72) Inventors: Sang Hoon Han, Seongnam-si (KR); Hong Youp Son, Seongnam-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 28 days.

(21) Appl. No.: 14/109,911

(22) Filed: Dec. 17, 2013

(65) Prior Publication Data
US 2015/0149006 A1 May 28, 2015

(30) Foreign Application Priority Data
Nov. 26, 2013 (KR) .................... 10-2013-0144375

(51) Int. Cl.
*B60L 11/00* (2006.01)
*B62M 6/45* (2010.01)
*H02J 7/14* (2006.01)
*B62M 6/40* (2010.01)

(52) U.S. Cl.
CPC . *B62M 6/45* (2013.01); *B62M 6/40* (2013.01); *H02J 7/1446* (2013.01); *H02J 7/1492* (2013.01)

(58) Field of Classification Search
CPC ............ Y02T 10/7005; Y02T 10/7275; Y02T 477/23; B60W 10/08; B62M 6/40; B62M 6/45; H02J 7/1492; H02J 7/1446
USPC .......... 701/22; 180/219, 220; 318/452; 477/3; 482/2
See application file for complete search history.

(56) References Cited

U.S. PATENT DOCUMENTS

| 5,836,414 | A | * | 11/1998 | Seto et al. | ............... 180/206.1 |
| 5,938,224 | A | * | 8/1999 | Brackett | ................... 280/216 |
| 6,573,686 | B2 | * | 6/2003 | Uno | ......................... 320/123 |
| 2014/0080661 | A1 | * | 3/2014 | Paick et al. | ................... 477/3 |

FOREIGN PATENT DOCUMENTS

JP 2006-8005 1/2006
KR 10-2012-0001834 1/2012

OTHER PUBLICATIONS

Office Action dated Mar. 20, 2015 for Korean Patent Application No. 10-2013-0144375.

* cited by examiner

*Primary Examiner* — Gertrude Arthur Jeanglaude
(74) *Attorney, Agent, or Firm* — Ladas & Parry, LLP

(57) ABSTRACT

Disclosed herein is an electric bicycle. The electric bicycle includes a battery, a generator to generate voltage by operation of pedals, and a pedal load adjustment unit to adjust pedal load applied to the pedals by controlling voltage generated from the generator and used to charge the battery. The pedal load adjustment unit includes plural capacitors configured to be charged with the voltage generated from the generator and plural switches configured to operate alternately so that the voltage generated from the generator is discharged to the capacitors to charge the capacitors and the voltage stored in the capacitors is discharged to the battery to charge the battery.

9 Claims, 8 Drawing Sheets

CHAINLESS ELECTRIC BICYCLE

CROSS-REFERENCE TO RELATED APPLICATION

This application claims the benefit of Korean Patent Application No. 2013-0144375, filed on Nov. 26, 2013 in the Korean Intellectual Property Office, the disclosure of which is incorporated in its entirety herein by reference.

BACKGROUND

1. Field

Embodiments of the present invention relate to a chainless electric bicycle including a motor to rotate a wheel and a generator connected to a pedal.

2. Description of the Related Art

In general, a chainless electric bicycle comprises a motor to rotate a wheel and a battery to supply power to the motor. Such an electric bicycle can run using rotational force generated from the motor and transmitted to a wheel to rotate the same. The battery is charged by operating a generator connected to a pedal. The operation of the generator is achieved by pedaling.

When riding a bicycle, a rider pedals and rider pedaling force is transmitted to wheels through a chain.

However, a chain has a complicated structure and occupies a large area. In addition, a chain is sometimes disengaged from a wheel, or rider's clothes get caught in a chain or stained.

In order to solve the above problems caused by a chain, chainless electric bicycles have been recently developed and have come onto the market.

In general, chainless electric bicycles can run using rider pedaling force or power of a motor which is operated by pressing a button provided at a handle unit.

A chainless electric bicycle includes a pedal load adjustment unit to adjust a pedal load. Due to the pedal load adjustment unit, when pedaling a chainless electric bicycle, a rider has a "pedal feel" which is similar to what a rider is used to in a typical bicycle having a chain. Accordingly, rider pedaling force is generated when pedaling a chainless electric bicycle.

So as to provide a rider with a "pedal feel" when he/she pedals, a pedal load adjustment unit, which functions as a voltage regulator, adjusts a pedal load applied to pedals by controlling the amount of power generated from a generator by operation of pedals and used to charge a battery.

However, as the amount of power generated from a generator is increased, voltage input to a pedal load adjustment unit rises and heat loss occurs at switching elements and resistors provided in the pedal load adjustment unit. Thus, generating efficiency is decreased and output voltage from the pedal load adjustment unit, which is input to a battery, also rises according to the high input voltage. For this reason, a conventional electric bicycle needs an additional circuit to limit the voltage output from the pedal load adjustment unit.

SUMMARY

It is an aspect of the present invention to provide a chainless electric bicycle capable of increasing generating efficiency by minimizing heat loss of a pedal load adjustment unit that is configured to adjust pedal load applied to pedals by controlling the amount of power generated from a generator and used to charge a battery.

Additional aspects of the invention will be set forth in part in the description which follows and, in part, will be obvious from the description, or may be learned by practice of the invention.

In accordance with one aspect of the present invention, an electric bicycle includes a battery, a generator to generate voltage by operation of pedals, and a pedal load adjustment unit to adjust pedal load applied to the pedals by controlling voltage generated from the generator and used to charge the battery. The pedal load adjustment unit includes plural capacitors configured to be charged with the voltage generated from the generator and plural switches configured to operate alternately so that the voltage generated from the generator is discharged to the capacitors to charge the capacitors and the voltage stored in the capacitors is discharged to the battery to charge the battery.

The pedal load adjustment unit may include a rectifier to rectify AC voltage generated from the generator to DC voltage, a first switch interposed between an output terminal of the rectifier and an input terminal of the battery, a second switch interposed between an output terminal of the first switch and an input terminal of the battery, a first capacitor interposed between a junction point of an output terminal of the rectifier and an input terminal of the first switch and the ground, a second capacitor interposed between a junction point of an output terminal of the first switch and an input terminal of the second switch and the ground, and a third capacitor interposed between a junction point of an output terminal of the second switch and an input terminal of the battery and the ground.

When the first switch is on, the second capacitor may be charged with voltage from the rectifier, and when the first switch is off and the second switch is on, voltage stored in the second capacitor may be discharged to the battery to charge the same.

When the second switch is on, the third capacitor may be charged with voltage from the second capacitor, and when the second switch is off, voltage stored in the third capacitor may be discharged to the battery to charge the same.

The second capacitor may have a larger capacity than the first capacitor and the third capacitor.

The pedal load adjustment unit may further include a third switch located upstream from the first switch and interposed between an output terminal of the rectifier and the ground.

The electric bicycle may further include an electronic control unit to control the pedal load adjustment unit so as to adjust pedal load applied to the pedals by controlling voltage output from the generator and used to charge the battery by alternately operating the plural switches of the pedal load adjustment unit.

The electronic control unit may turn the second switch off and the first switch on so that the second capacitor is charged with voltage from the rectifier, and may turn the first switch off and the second switch on so that the battery is charged with voltage from the second capacitor.

The electronic control unit may perform PWM control with respect to the first switch and the second switch. When increasing pedal load applied to the pedals, the electronic control unit may control a duty ratio of the first switch and the second switch so that a ratio of the duty ratio of the first switch to the duty ratio of the second switch approximates to a preset ratio. When decreasing pedal load applied to the pedals, the electronic control unit may control a duty ratio of the first switch and the second switch so that a ratio of the duty ratio of the first switch to the duty ratio of the second switch deviates from the preset ratio.

The pedal load adjustment unit may further include a third switch located upstream from the first switch and interposed between an output terminal of the rectifier and the ground. So as to provide a rider with an initial pedal feel when the rider starts to pedal the pedals, the electronic control unit may temporarily turn the third switch on and may turn the third switch off when the first switch and the second switch are in an off state.

As described above, the amount of power output from the generator and used to charge the battery is adjusted by alternately operating the plural switches of the pedal load adjustment unit. Therefore, pedal load is easily adjusted, and a voltage drop of the pedal load adjustment unit is decreased although the amount of power generated from the generator is increased. Accordingly, heat loss is remarkably reduced and generating efficiency is increased.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
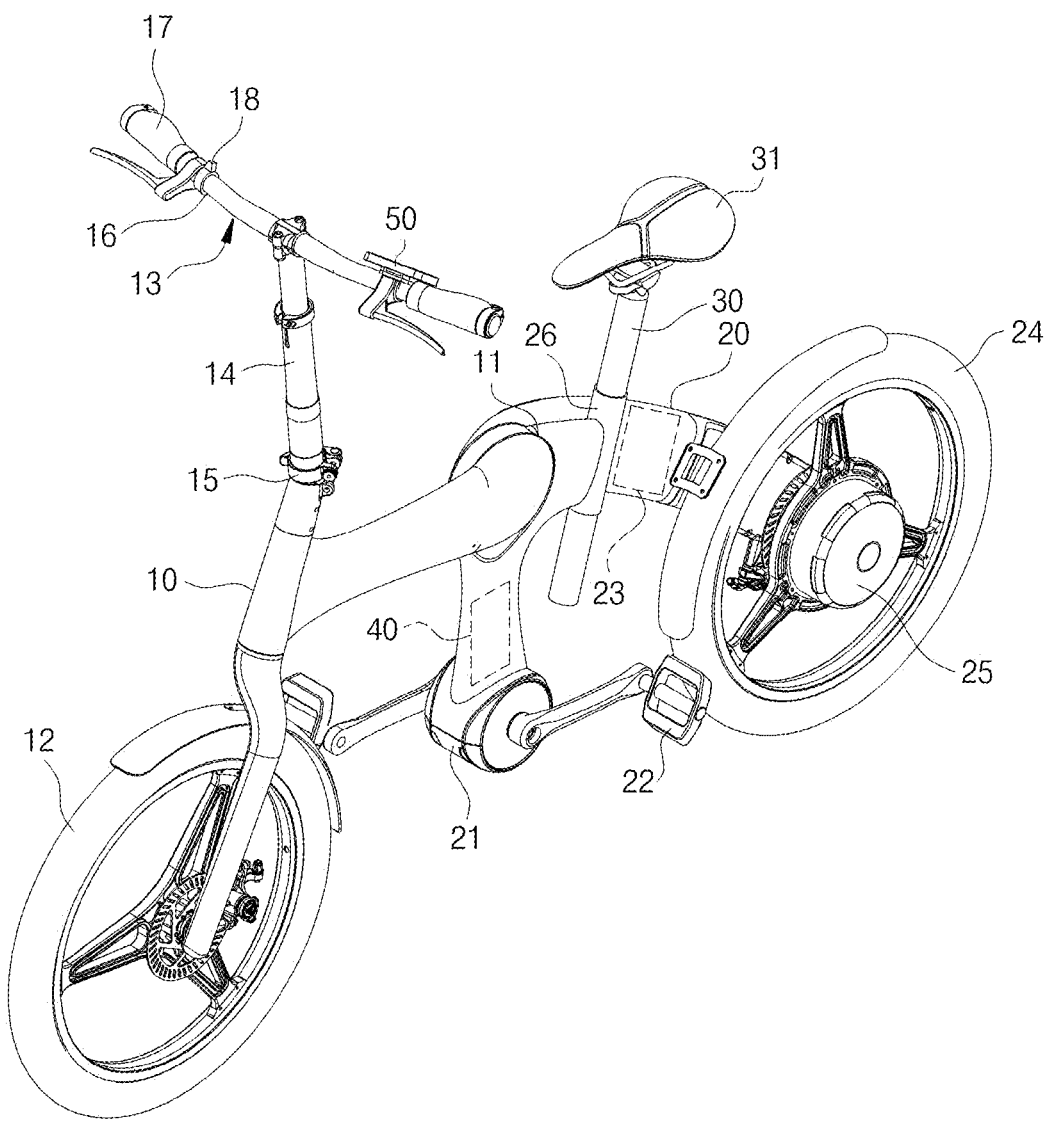
FIG. 1 is a perspective view illustrating a chainless electric bicycle according to an embodiment of the present invention.

Now, preferred embodiments of the present invention will be described in detail with reference to the annexed drawings. The preferred embodiments described in the following specification and shown in the accompanying drawings are illustrative only and are not intended to represent all aspects of the invention, so that it is to be understood that various equivalents and modifications can be made without departing from the spirit of the invention. In the drawings, elements unrelated to the embodiments of the present invention are omitted from depiction for clarity, and the component's width, length, thickness, etc. are exaggerated for convenience. Like numbers refer to like elements throughout the description of the figures.

It will also be understood that the term "and/or" as used herein refers to and encompasses any and all possible combinations of one or more of the associated listed items. It should be noted that if it is described in the specification that one component is "connected" or "coupled" to another component, the former may be directly "connected" or "coupled" to the latter or "connected" or "coupled" to the latter via another component. As used in the description of the invention and the appended claims, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

FIG. 1 is a perspective view illustrating a chainless electric bicycle according to an embodiment of the present invention.

As shown in FIG. 1, an electric bicycle comprises a front frame 10, a rear frame 20 and a saddle frame 30.

The front frame 10 and the rear frame 20 are coupled to a hinge plate 11 which is axially coupled to a hinge shaft so as to rotate forward and backward about the hinge shaft.

A handle stay 14, to which a front wheel 12 and a handle unit 13 are connected, is coupled to an end of the front frame 10.

The handle unit 13 includes a handle stem 15 coupled to a middle portion of the handle stay 14, a handle bar 16 coupled to an upper end of the handle stay 14, a handle grip 17 mounted to the handle bar 16, and a throttle 18 through which a rider inputs an acceleration command.

The handle stem 15 is configured to adjust a height of the handle unit 13. The handle bar 16 is configured to steer a bicycle. The handle grip 17 is provided with an interface device 50 to display the states of the electric bicycle and transmit rider commands input through buttons to an electronic control unit 40 (described later). The interface device 50 is electrically connected to the electronic control unit 40. The throttle 18 may be formed in a lever type that a rider manipulates, and outputs a signal corresponding to a rotation degree of the throttle 18 by rider manipulation. Similar to typical throttles, the throttle 18 detects an opening degree of a throttle valve provided therein and outputs a signal corresponding to the detected result.

The front wheel 12 is rotatably coupled to a lower end of the handle stay 14. In this embodiment, the front wheel 12 is disposed at a lower right position of the handle stay 14 when viewed from the rear. However, the front wheel 12 may be disposed at a lower left position of the handle stay 14 or may be coupled to a fork-shaped handle stay as in a typical bicycle.

A generator 21 is mounted to one end of the rear frame 20. Pedals 22 are rotatably mounted to both sides of the generator 21. When a rider rotates the pedals 22, the generator 21 converts rotational force of the pedals 22 into electric energy, and the electric energy is used to charge a battery 23.

A rear wheel 24 is rotatably mounted to the other end of the rear frame 20. The rear wheel 24 is disposed at a left position of the rear frame 20 when viewed from the rear. However, the rear wheel 24 may be disposed at a right position of the rear frame 20 or may be coupled to a fork-shaped rear frame as in a typical bicycle.

The rear wheel 24 is mounted with a motor 25 to rotate the rear wheel 24, thereby enabling the electric bicycle to run automatically. The motor 25 may be mounted with a transmission to change a rotating speed of the rear wheel 24 according to rider's manipulation through the interface device 50.

The battery 23, which is charged with electric energy converted through the generator 21, and the electronic control unit 40 may be mounted inside the rear frame 20. The battery 23 may be mounted inside the front frame 10 as well as the rear frame 20.

A seat tube 26 is coupled to a portion of the rear frame 20. The seat tube 26 and the rear frame 20 may be integrally formed.

The saddle frame 30 is connected to the rear frame 20. A saddle 31 is mounted to an upper end of the saddle frame 30.

Figure 2:
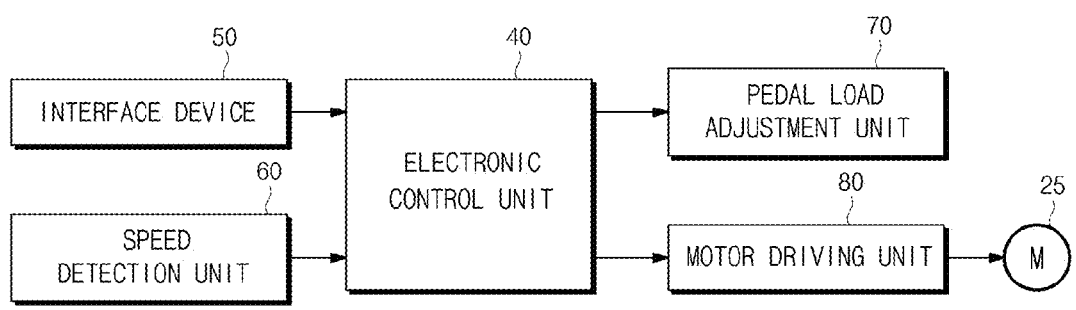
FIG. 2 is a control block diagram of the chainless electric bicycle according to an embodiment of the present invention.

FIG. 2 is a control block diagram of the chainless electric bicycle according to an embodiment of the present invention.

Referring to FIG. 2, the electric bicycle includes an electronic control unit 40, an interface device 50, a speed detection unit 60, a pedal load adjustment unit 70 and a motor drive unit 80.

The interface device 50 is configured to display the states of the electric bicycle and transmit rider commands input through buttons to the electronic control unit 40.

The speed detection unit 60 is configured to detect a speed of the electric bicycle. For instance, the speed detection unit 60 may be a wheel speed sensor that detects a wheel speed of the front wheel 12.

The pedal load adjustment unit 70 is configured to adjust a load of the pedals 22. The pedal load adjustment by the pedal load adjustment unit 70 makes a rider have a "pedal feel" which is similar to what a rider is used to in a typical bicycle having a chain. In addition, the pedal load adjustment unit 70 may make a rider not have such a "pedal feel", if necessary.

The pedal load adjustment unit 70 may adjust pedal load applied to the pedals 22 by controlling the amount of power generated from the generator 21 by operation of the pedals 22 and used to charge the battery 23. If the pedal load adjustment unit 70 applies pedal load to the pedals 22, a rider has a "pedal feel" because he/she should pedal the pedals 22 strongly to rotate the same.

The pedal load adjustment unit 70 removes pedal load from the pedals 22 by opening both output terminals of the generator 21 and applies pedal load to the pedals 22 by controlling a duty ratio through pulse width modulation (PWM) control. When pedal load is applied to the pedals 22, a rider has a "pedal feel" and should pedal the pedals 22 strongly to rotate the same. If pedal load is removed from the pedals 22, a rider can move the pedals 22 rapidly to desired positions with a relatively small force because the pedals 22 rotate smoothly with little resistance.

Figure 3:
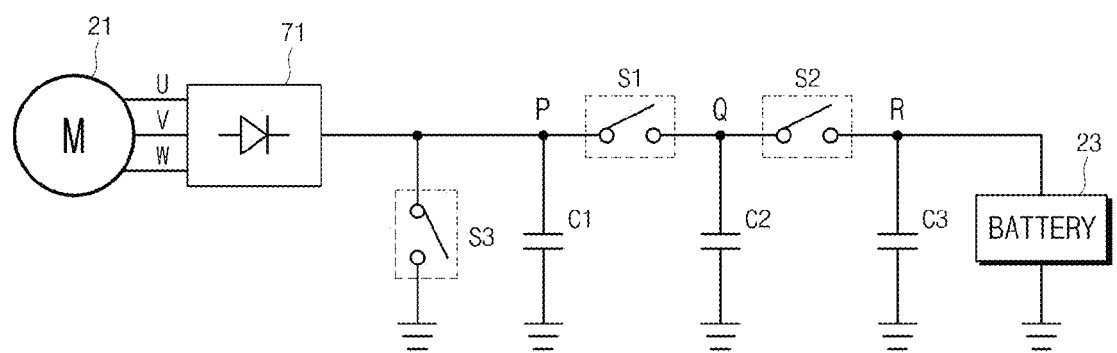
FIG. 3 is a view to explain constitution of a pedal load adjustment unit of the chainless electric bicycle according to an embodiment of the present invention.

FIG. 3 is a view to explain the constitution of the pedal load adjustment unit of the chainless electric bicycle according to an embodiment of the present invention.

Referring to FIG. 3, the pedal load adjustment unit 70 includes a generator 21 to generate an AC voltage by the rotation of the pedals 22, a rectifier 71 to rectify the AC voltage generated from the generator 21 to DC voltage, plural capacitors C1, C2 and C3 to smooth the output voltage from the rectifier 71, and plural switches S1, S2 and S3 interposed between the generator 21 and the battery 23 which is charged with the voltage smoothed by the plural capacitors C1, C2 and C3.

The first switch S1 is interposed between an output terminal of the rectifier 71 and an input terminal of the battery 23. The first switch S1 is used to control a duty ratio by changing a duty on time and a duty off time through the electronic control unit 40.

The second switch S2 is interposed between an output terminal of the first switch S1 and an input terminal of the battery 23. The first switch S1 and the second switch S2 are used to control a duty ratio by changing a duty on time and a duty off time through the electronic control unit 40.

The third switch S3 is interposed between an output terminal of the rectifier 71 and the ground. The third switch S3 is used to control a duty ratio by changing a duty on time and a duty off time through the electronic control unit 40 or used for on/off control.

The operational purpose of the third switch S3 is to provide a rider with an initial "pedal feel" when he/she starts to pedal. The operational purpose of the first and second switches S1 and S2 is to control the "pedal feel" after the initial "pedal feel" is provided to a rider. It is also possible to alternately operate the first switch S1 and the second switch S2 for smooth change of the initial "pedal feel".

The first, second and third switches S1, S2 and S3 may be an electronic switching element, such as a field effect transistor (FET), a transistor (TR) or the like.

The first capacitor C1 is interposed between a junction point P of an output terminal of the rectifier 71 and an input terminal of the first switch S1 and the ground. When the third switch S3 is off, the first capacitor C1 is charged with the output voltage from the rectifier 71.

The second capacitor C2 is interposed between a junction point Q of an output terminal of the first switch S1 and an input terminal of the second switch S2 and the ground. When the first switch S1 is on, the second capacitor C2 is charged with the voltage from the rectifier 71. Additionally, when the first switch S1 is off and the second switch S2 is on, voltage stored in the second capacitor C2 is discharged to the third capacitor C3 and the battery 23, thereby charging the third capacitor C3 and the battery 23. The second capacitor C2 has a larger capacity than the first capacitor C1 and the third capacitor C3.

The third capacitor C3 is interposed between a junction point R of an output terminal of the second switch S2 and an input terminal of the battery 23 and the ground. When the second switch S2 is on, the third capacitor C3 is charged with the voltage stored in the second capacitor C2. Additionally, when the second switch S2 is off, voltage stored in the third capacitor C3 is discharged to the battery 23, thereby charging the battery 23.

Figure 4:
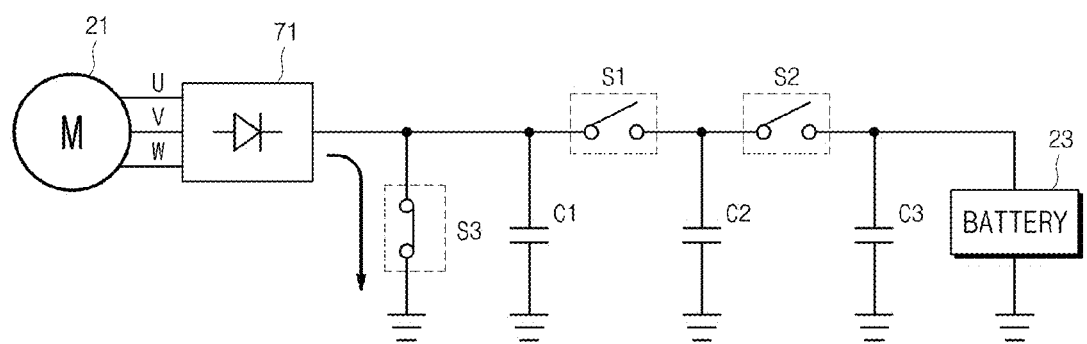
FIGS. 4 through 6 are views to explain operation of the pedal load adjustment unit of the chainless electric bicycle according to an embodiment of the present invention.
Figure 5:
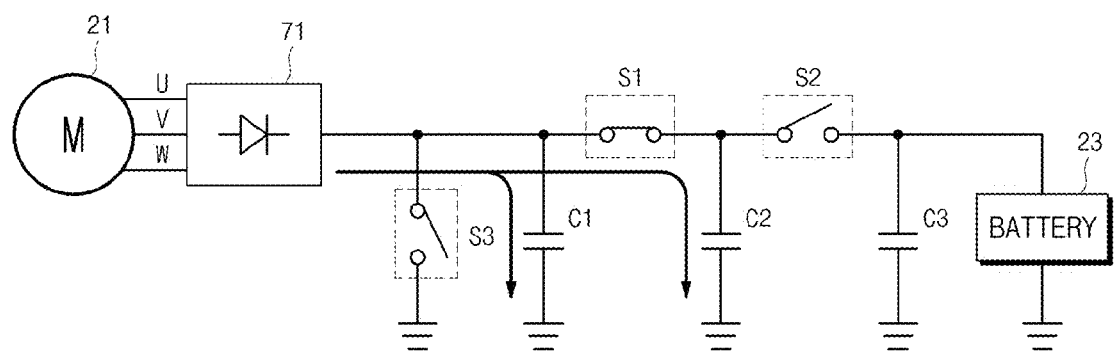
Figure 6:
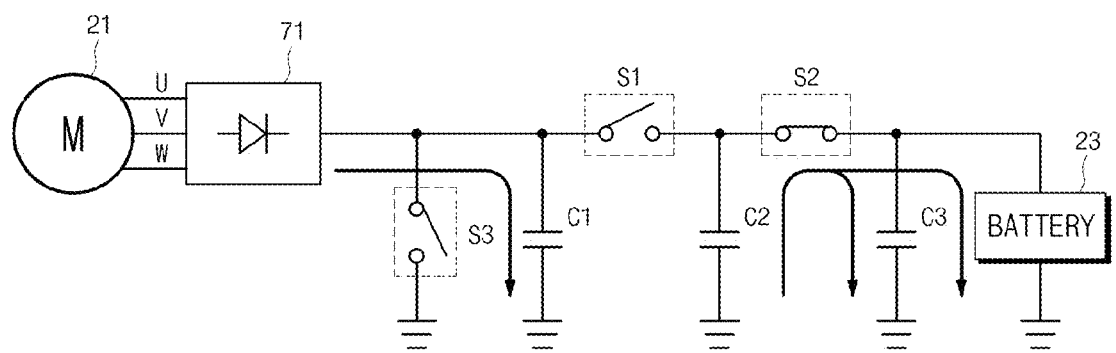

FIGS. 4 through 6 are views to explain the operation of the pedal load adjustment unit of the chainless electric bicycle according to an embodiment of the present invention.

Referring to FIGS. 4 through 6, when a rider pedals to start an electric bicycle or to continue riding, the electronic control unit 40 controls pedal load applied to the pedals 22 using the pedal load adjustment unit 70 according to the speed of the electric bicycle.

In detail, when a rider starts to pedal the pedals of the electric bicycle, the third switch S3 is temporarily turned on and then turned off so that a rider has an initial "pedal feel". At this time, when the third switch S3 is turned on, output current from the rectifier 71 is bypassed to the ground via the third switch S3 as illustrated by arrows in the drawings. Accordingly, since the power circuit connected to the generator 21 forms a closed circuit, counter electromotive force is generated at the generator 21, thereby applying pedal load to the pedals. As a result, because a user should pedal the pedals 22 strongly to rotate the same, he/she has a "pedal feel" (refer to FIG. 4).

After that, while the electric bicycle runs, the electronic control unit 40 performs PWM control with respect to the first switch S1 and the second switch S2 of the pedal load adjustment unit 70, and alternately operates the first switch S1 and the second switch S2.

As shown in FIG. 5, when the second switch S2 and the third switch S3 are off, if the electronic control unit 40 turns the first switch S1 on, output current from the rectifier 71 flows as illustrated by arrows, and the first capacitor C1 and the second capacitor C2 are charged with output voltage from the rectifier 71. At this time, because the second switch S2 is in an off state, the battery 23 is not charged with the voltage. Because there is no voltage stored in the second capacitor C2 at an initial stage, a voltage drop corresponding to a voltage difference between both terminals of the first switch S1 occurs and accordingly heat loss occurs. However, when the first switch S1 is turned on again at a later operation, the second capacitor C2 is in a state of being charged with the minimum amount of voltage and accordingly a voltage difference between both terminals of the first switch S1 is reduced. As a result, a voltage drop corresponding to a voltage difference between both terminals of the first switch S1 is also reduced, thereby remarkably decreasing heat loss and increasing generating efficiency.

From the above state, if the first switch S1 is turned off and the second switch S2 is turned on as shown in FIG. 6, a current flow is made as illustrated by arrows and thus voltage stored in the second capacitor C2 is discharged to the third capacitor C3 and the battery 23, thereby charging the third capacitor C3 and the battery 23. When voltage of the batter 23 is low, a voltage drop corresponding to a voltage difference between both terminals of the second switch S2 occurs.

However, when the second switch S2 is turned on again at a later operation, the battery 23 or the third capacitor C3 is in a state of being charged with the minimum amount of voltage and accordingly a voltage difference between both terminals of the second switch S2 is reduced. As a result, a voltage drop corresponding to a voltage difference between both terminals of the second switch S2 is also reduced, thereby remarkably decreasing heat loss and increasing generating efficiency.

Figure 7:
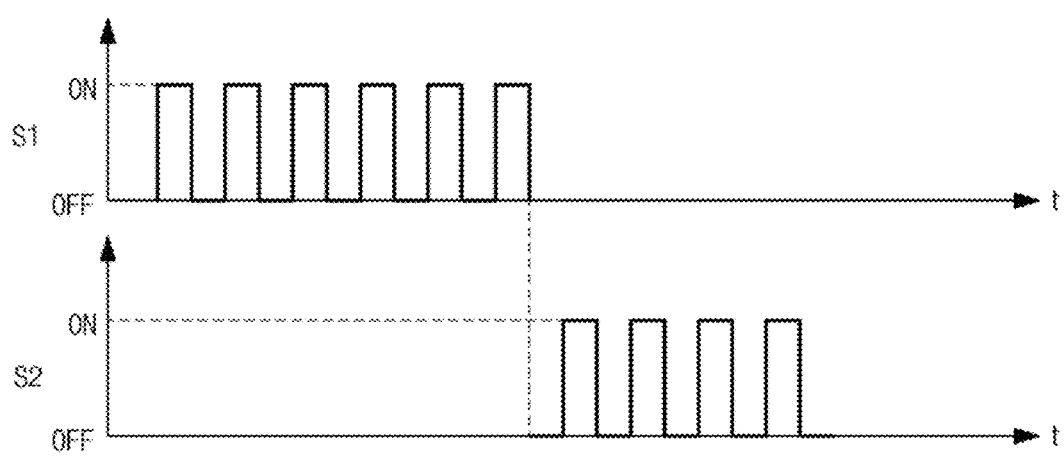
FIGS. 7 and 8 are timing diagrams of a first switch and a second switch according to pedal load of the pedal load adjustment unit of the chainless electric bicycle according to an embodiment of the present invention.
Figure 8:
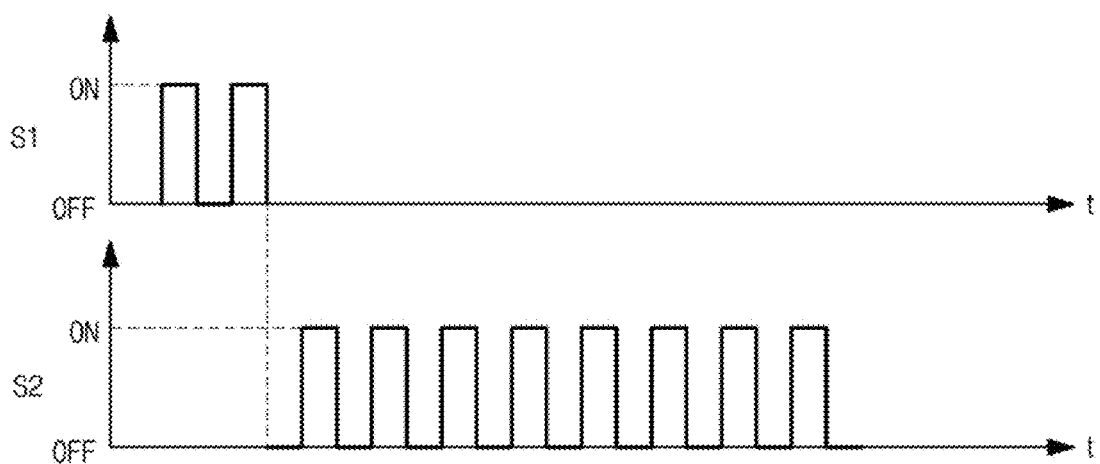

FIGS. 7 and 8 are timing diagrams of the first switch and the second switch according to pedal load of the pedal load adjustment unit of the chainless electric bicycle according to an embodiment of the present invention.

The electronic control unit 40 controls a duty ratio by performing PWM control with respect to the first switch S1 and the second switch S2 so that the first switch S1 and the second switch S2 are switched alternately.

When increasing pedal load applied to the pedals 22, the electronic control unit 40 controls a duty ratio of the first switch S1 and the second switch S2 so that a ratio of the duty ratio of the first switch S1 to the duty ratio of the second switch S2 approximates to a preset ratio (refer to FIG. 7). Here, the preset ratio of the duty ratio of the first switch S1 to the duty ratio of the second switch S2 may be 6:4.

In addition, when decreasing pedal load applied to the pedals 22, the electronic control unit 40 controls a duty ratio of the first switch S1 and the second switch S2 so that a ratio of the duty ratio of the first switch S1 to the duty ratio of the second switch S2 deviates from the preset ratio, e.g., 6:4 (refer to FIG. 8).

As described above, the amount of power output from the generator 21 and used to charge the battery 23 is adjusted by alternately operating the plural switches of the pedal load adjustment unit 70. Therefore, pedal load is easily adjusted, and a voltage drop of the pedal load adjustment unit 70 is decreased although the amount of power generated from the generator 21 is increased. Accordingly, heat loss is remarkably reduced and generating efficiency is increased. In addition, since a field effect transistor (FET) having low withstand voltage may be used as the switches of the pedal load adjustment unit 70, manufacturing costs may be reduced without the need for a heat-radiation structure.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:
1. An electric bicycle comprising:
a battery;
a generator to generate voltage by operation of pedals; and
a pedal load adjustment unit to adjust pedal load applied to the pedals by controlling voltage generated from the generator and used to charge the battery,
wherein the pedal load adjustment unit includes plural capacitors configured to be charged with the voltage generated from the generator and plural switches configured to operate alternately so that the voltage generated from the generator is discharged to the capacitors to charge the capacitors and the voltage stored in the capacitors is discharged to the battery to charge the battery,
wherein the pedal load adjustment unit includes:
a rectifier to rectify AC voltage generated from the generator to DC voltage;
a first switch interposed between an output terminal of the rectifier and an input terminal of the battery;
a second switch interposed between an output terminal of the first switch and an input terminal of the battery;
a first capacitor interposed between a junction point of an output terminal of the rectifier and an input terminal of the first switch and the ground;
a second capacitor interposed between a junction point of an output terminal of the first switch and an input terminal of the second switch and the ground; and
a third capacitor interposed between a junction point of an output terminal of the second switch and an input terminal of the battery and the ground.

2. The electric bicycle according to claim 1, wherein when the first switch is on, the second capacitor is charged with voltage from the rectifier, and
when the first switch is off and the second switch is on, voltage stored in the second capacitor is discharged to the battery to charge the same.

3. The electric bicycle according to claim 2, wherein when the second switch is on, the third capacitor is charged with voltage from the second capacitor, and
when the second switch is off, voltage stored in the third capacitor is discharged to the battery to charge the same.

4. The electric bicycle according to claim 2, wherein the second capacitor has a larger capacity than the first capacitor and the third capacitor.

5. The electric bicycle according to claim 1, wherein the pedal load adjustment unit further includes a third switch located upstream from the first switch and interposed between an output terminal of the rectifier and the ground.

6. The electric bicycle according to claim 1, further comprising:
an electronic control unit to control the pedal load adjustment unit so as to adjust pedal load applied to the pedals by controlling voltage output from the generator and used to charge the battery by alternately operating the plural switches of the pedal load adjustment unit.

7. The electric bicycle according to claim 6, wherein the electronic control unit turns the second switch off and the first switch on so that the second capacitor is charged with voltage from the rectifier, and turns the first switch off and the second switch on so that the battery is charged with voltage from the second capacitor.

8. The electric bicycle according to claim 7, wherein the electronic control unit performs PWM control with respect to the first switch and the second switch,
wherein when increasing pedal load applied to the pedals, the electronic control unit controls a duty ratio of the first switch and the second switch so that a ratio of the duty ratio of the first switch to the duty ratio of the second switch approximates to a preset ratio, and when decreasing pedal load applied to the pedals, the electronic control unit controls a duty ratio of the first switch and the second switch so that a ratio of the duty ratio of the first switch to the duty ratio of the second switch deviates from the preset ratio.

9. The electric bicycle according to claim 6, wherein the pedal load adjustment unit further includes a third switch located upstream from the first switch and interposed between an output terminal of the rectifier and the ground,
wherein so as to provide a rider with an initial pedal feel when the rider starts to pedal the pedals, the electronic control unit temporarily turns the third switch on and turns the third switch off when the first switch and the second switch are in an off state.

* * * * *